United States Patent
Lee et al.

(10) Patent No.: US 12,002,272 B2
(45) Date of Patent: Jun. 4, 2024

(54) METHOD AND DEVICE FOR CLASSIFING DENSITIES OF CELLS, ELECTRONIC DEVICE USING METHOD, AND STORAGE MEDIUM

(71) Applicant: HON HAI PRECISION INDUSTRY CO., LTD., New Taipei (TW)

(72) Inventors: Wan-Jhen Lee, New Taipei (TW); Chih-Te Lu, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 405 days.

(21) Appl. No.: 17/564,496

(22) Filed: Dec. 29, 2021

(65) Prior Publication Data

US 2022/0207892 A1     Jun. 30, 2022

(30) Foreign Application Priority Data

Dec. 30, 2020   (CN) .......................... 202011613589

(51) Int. Cl.
*G06K 9/00*     (2022.01)
*G06N 3/08*     (2023.01)
(Continued)

(52) U.S. Cl.
CPC ............. *G06V 20/693* (2022.01); *G06N 3/08* (2013.01); *G06T 7/0012* (2013.01); *G06V 10/82* (2022.01);
(Continued)

(58) Field of Classification Search
CPC .... G06V 20/693; G06V 10/82; G06V 10/454; G06V 20/698; G06N 3/08; G06N 3/045;
(Continued)

(56) References Cited

U.S. PATENT DOCUMENTS

2021/0216746 A1*  7/2021  Nie .................... G06V 10/454
2023/0030506 A1*  2/2023  Jaber .................. G06F 18/2413

FOREIGN PATENT DOCUMENTS

CN    110033440 A    7/2019
CN    111898578 A    11/2020

OTHER PUBLICATIONS

Ren, Yazhou, et al. "Deep Density-based Image Clustering." arXiv preprint arXiv:1812.04287 (2018). (Year: 2018).*
(Continued)

*Primary Examiner* — Andrew M Moyer
(74) *Attorney, Agent, or Firm* — ScienBiziP, P.C.

(57) ABSTRACT

A method for classifying cells densities by cell images being input into artificial computer intelligence obtains positional information of all central points of all groups of first encoding features generated when training a model of convolutional neural network and ranges of densities of images of biological cells represented by different central points. The method inputs a test image of the biological cells into a trained model of the convolutional neural network to encode the test image, to obtain a second encoding feature. The method also determines a central point nearest to the second encoding feature according to the positional information. The method determines a range of densities of the test image according to the ranges of densities of the images represented by different central points and the central point nearest to the second encoding feature. An electronic device and a non-transitory storage medium are also disclosed.

20 Claims, 7 Drawing Sheets

(51) Int. Cl.
  *G06T 7/00*     (2017.01)
  *G06V 10/82*    (2022.01)
  *G06V 20/69*    (2022.01)
(52) U.S. Cl.
  CPC .............. *G06T 2207/20081* (2013.01); *G06T 2207/20084* (2013.01); *G06T 2207/30024* (2013.01)
(58) Field of Classification Search
  CPC ............... G06N 3/04; G06T 7/0012; G06T 2207/20081; G06T 2207/20084; G06T 2207/30024; G06T 2207/30242; G06F 18/214; G06F 18/24133
  See application file for complete search history.

(56)           References Cited

OTHER PUBLICATIONS

He, Shenghua, et al. "Automatic microscopic cell counting by use of unsupervised adversarial domain adaptation and supervised density regression." arXiv preprint arXiv:1903.00388 (2019). (Year: 2019).*

Enguehard, Joseph, Peter O'Halloran, and Ali Gholipour. "Semi-supervised learning with deep embedded clustering for image classification and segmentation." Ieee Access 7 (2019): 11093-11104. (Year: 2019).*

* cited by examiner

METHOD AND DEVICE FOR CLASSIFING DENSITIES OF CELLS, ELECTRONIC DEVICE USING METHOD, AND STORAGE MEDIUM

FIELD

The subject matter herein generally relates to image-analysis for medical purposes, artificial computer intelligence and particularly, to a method and a device for classifying densities of cells, an electronic device using method, and a storage medium.

BACKGROUND

When researching into biological cells, for example biological stem cells, although an actual number and volume of the stem cells in an image may not need to be known, a range of densities of the stem cells in the image must be established. However, a cell-counting method calculates a number and volume of the stem cells in an image, and calculates the range of densities of the stem cells in the image according to the number and the volume of the stem cells, this is very inefficient and time-consuming.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
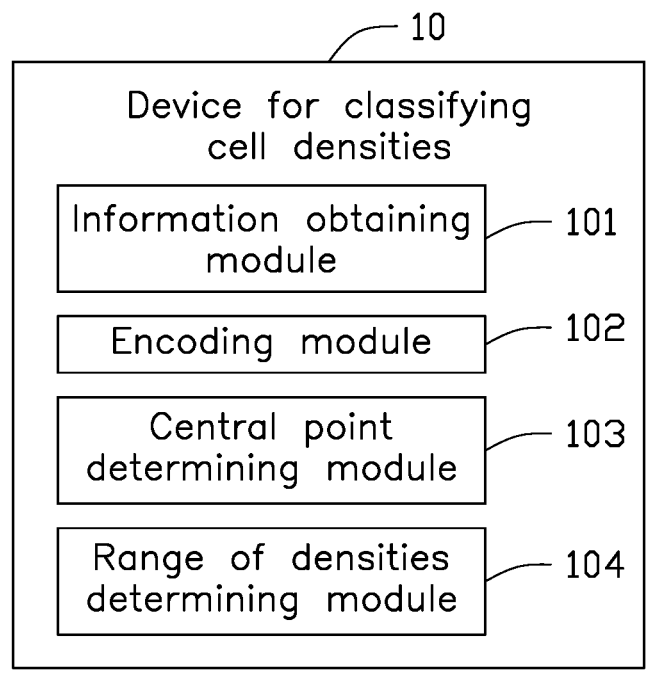
FIG. 1 illustrates a block diagram of a device for classifying densities of cells in a first embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, referencing the accompanying drawings, is illustrated by way of examples and not by way of limitation. It should be noted that references to "an" or "one" embodiment in this disclosure are not necessarily to the same embodiment, and such references mean "at least one."

FIG. 1 illustrates a device for classifying densities of cells in a first embodiment. The device for classifying cell densities (hereinafter CCD device 10) can be applied in an electronic device. The electronic device can be a smart phone, a desktop computer, a tablet computer, or the like. The CCD device 10 can include an information obtaining module 101, an encoding module 102, a central point determining module 103, and a range of densities determining module 104. The information obtaining module 101 is configured to obtain positional information of all central points of all groups of first encoding features generated when training a model of convolutional neural network and ranges of densities of images of biological cells represented by different central points. Each of the groups of the first encoding features includes a central point and corresponds to a number of images of the biological cells within a range of densities. The encoding module 102 is configured to input a test image of the biological cells into a trained model of the convolutional neural network to encode the test image of the biological cells, to obtain a second encoding feature. The central point determining module 103 is configured to determine a central point nearest to the second encoding feature according to the positional information of all the central points of all the groups of the first encoding features. The range of densities determining module 104 is configured to determine a range of densities of the test image of the biological cells according to the ranges of densities of the images of the biological cells represented by different central points and the central point nearest to the second encoding feature.

Figure 2:
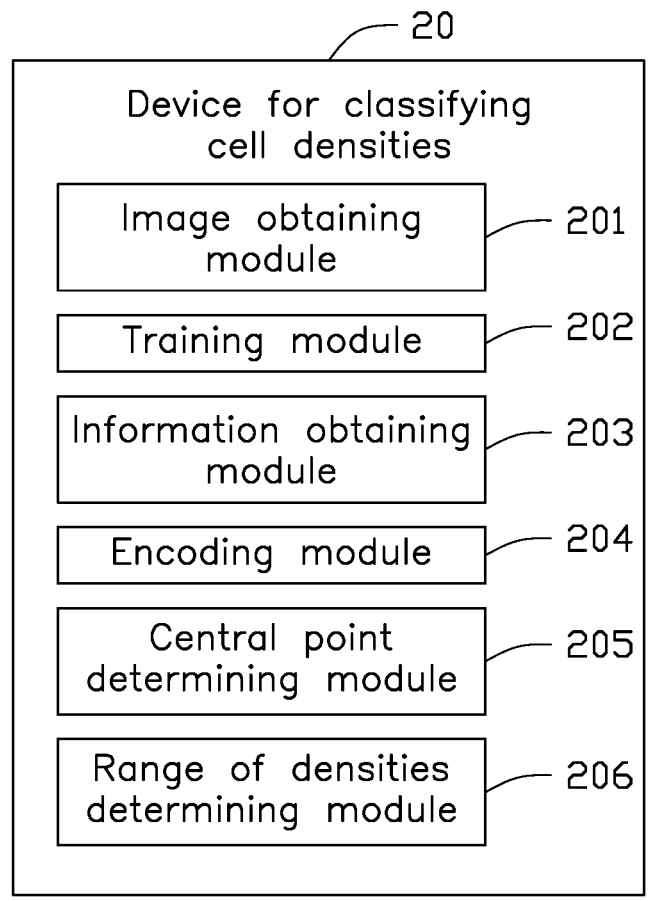
FIG. 2 illustrates a block diagram of a device for classifying densities of cells in a second embodiment.

FIG. 2 illustrates a block diagram of a CCD device in a second embodiment. The CCD device 20 can be applied in an electronic device. The electronic device can be a smart phone, a desktop computer, a tablet computer, or the like. The CCD device 20 can include an image obtaining module 201, a training module 202, an information obtaining module 203, an encoding module 204, a central point determining module 205, and a range of densities determining module 206. The image obtaining module 201 is configured to obtain a number of training images of the biological cells with different densities. The training module 202 is configured to input the training images of the biological cells with different densities one by one into a model of convolutional neural network to train one by one to obtain a trained model of the convolutional neural network. The information obtaining module 203 is configured to obtain positional information of all central points of all groups of first encoding features generated when training the model of the convolutional neural network and ranges of densities of images of the biological cells represented by different central points. Each of the groups of the first encoding features includes a central point and corresponds to a number of images of the biological cells within a range of densities. The encoding module 204 is configured to input a test image of the biological cells into the trained model of the convolutional neural network to encode the test image of the biological cells, to obtain a second encoding feature. The central point determining module 205 is configured to determine a central point nearest to the second encoding feature according to the positional information of all the central points of all the groups of the first encoding features. The range of densities determining module 206 is configured to determine a range of densities of the test image of the biological cells according to the ranges of densities of the images of the biological cells represented by different central points and the central point nearest to the second encoding feature.

Details of the functions of the modules 101~104 and modules 201~206 will be described with reference to a flowchart of a method for classifying densities of cells.

Figure 3:
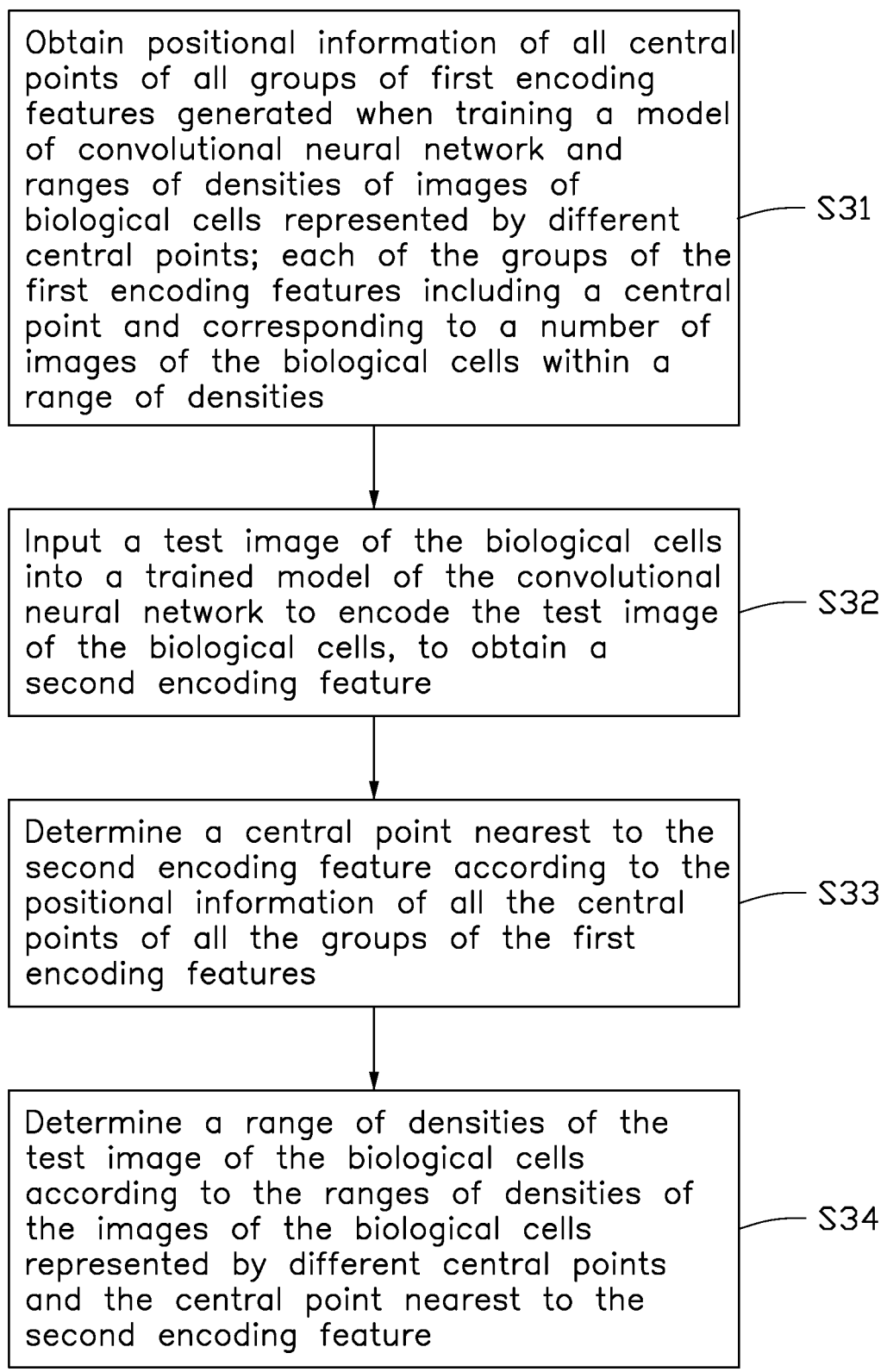
FIG. 3 illustrates a flowchart of a method for classifying densities of cells in a first embodiment.

FIG. 3 is a flowchart of a method for classifying densities of cells in a first embodiment. The method for classifying densities of cells can include the following:

At block S31, obtaining positional information of all central points of all groups of first encoding features generated when training a model of convolutional neural network and ranges of densities of images of biological cells represented by different central points. Each of the groups of the first encoding features includes a central point and corresponds to a number of images of the biological cells within a range of densities.

The model of the convolutional neural network can include an encoder. In the embodiment, the model of the convolutional neural network can be an autoencoder. The first encoding features can be features generated by the encoder of the model of the convolutional neural network when encoding the images of the biological cells, namely features output from a hidden layer. Each first encoding feature can be a set of numbers, for example numbers representing a multidimensional space a $(x11, x12, \ldots, x1n)$. Each first encoding feature can represent positional information. The first encoding features generated from the images of the biological cells with different densities can be different. Each central point can be a central point of positions of the corresponding group of the first encoding features. The positional information can be a multidimensional space number. The images of the biological cells can be the images of the biological cells with the same type. Each image of the biological cells can be, for example, an image of biological stem cells. An image of the biological stem cells includes stem cells and other substances. The other substances can be impurity or other cells. The ranges of densities can be, for example from zero to 40%, from 40% to 60%, from 60% to 80%, and from 80% to 100%.

At block S32, inputting a test image of the biological cells into a trained model of the convolutional neural network to encode the test image of the biological cells, to obtain a second encoding feature.

The trained model of the convolutional neural network can include an encoder. The second encoding features can be a feature generated by the encoder of the trained model of the convolutional neural network when encoding the test image of the biological cells. The second encoding feature can be a set of numbers, for example, numbers representing a multidimensional space. Each second encoding feature can represent positional information.

At block S33, determining a central point nearest to the second encoding feature according to the positional information of all the central points of all the groups of the first encoding features.

A method of determining a central point nearest to the second encoding feature according to the positional information of all central points of all the groups of the first encoding features includes a block a1 and a block a2. The block a1 includes determining distances between the second encoding feature and the positional information of all central points of all the groups of the first encoding features according to the positional information of all central points of all groups of first encoding features. The block a2 includes determining the central point nearest to the second encoding feature according to the distances. In the embodiment, the distance can be an Euclidean distance.

At block S34, determining a range of densities of the test image of the biological cells according to the ranges of densities of the images of the biological cells represented by different central points and the central point nearest to the second encoding feature.

The block S34 can include determining the range of densities of the test image of the biological cells to be the range of densities of the image of the biological cells represented by the central point nearest to the second encoding feature.

In the disclosure, positional information of all central points of all groups of first encoding features generated when training a model of convolutional neural network and ranges of densities of images of biological cells represented by different central points is obtained. Each of the groups of the first encoding features includes a central point and corresponds to a number of images of the biological cells within a range of densities. The disclosure inputs a test image of the biological cells into the trained model of the convolutional neural network to encode the test image of the biological cells, to obtain a second encoding feature. The disclosure determines a central point nearest to the second encoding feature according to the positional information of all central points of all groups of the first encoding features. The disclosure determines a range of densities of the test image of the biological cells according to the ranges of densities of images of the biological cells represented by different central points and the central point nearest to the second encoding feature. Thus, a range of densities of the test image of the biological cells is determined, according to the trained model of the convolutional neural network, the positional information of all central points of all groups of the first encoding features generated when training a model of the convolutional neural network, and ranges of densities of the images of the biological cells represented by different central points. The number and volume of the cells do not need to be calculated, improving a speed of counting cells.

Figure 4:
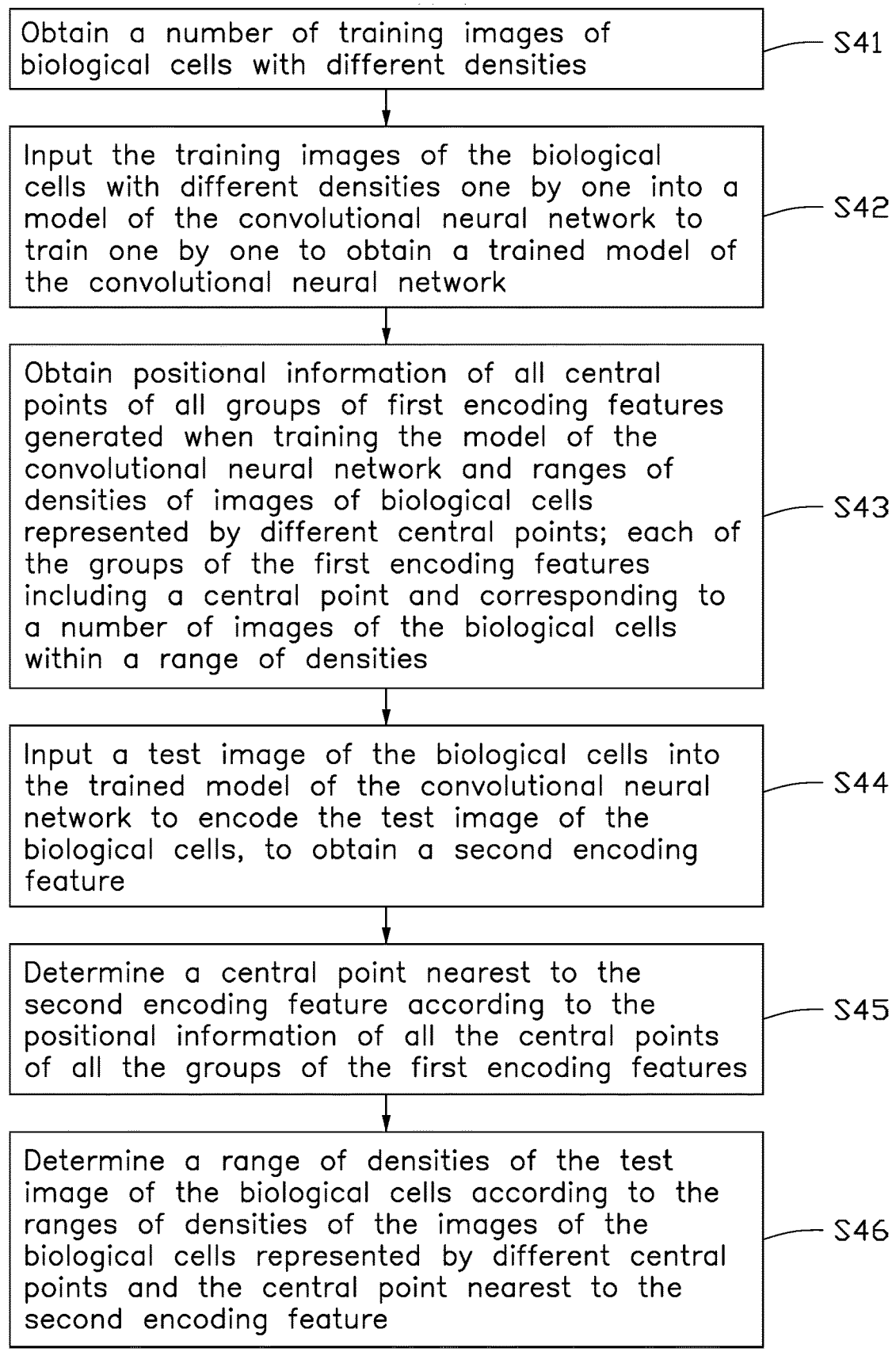
FIG. 4 illustrates a flowchart of a method for classifying densities of cells in a second embodiment.

FIG. 4 is a flowchart of a method for classifying densities of cells in a second embodiment. This method for classifying densities of cells can include the following:

At block S41, obtaining a number of training images of biological cells with different densities.

A method of obtaining a number of training images of biological cells with different densities can include obtaining a number of training images of the biological cells and different training images of the biological cells having different densities. A density range formed by the different densities of the training images of the biological cells may be from zero to 100%.

At block S42, inputting the training images of the biological cells with different densities one by one into a model of the convolutional neural network to train one by one to obtain a trained model of the convolutional neural network.

Figure 5:
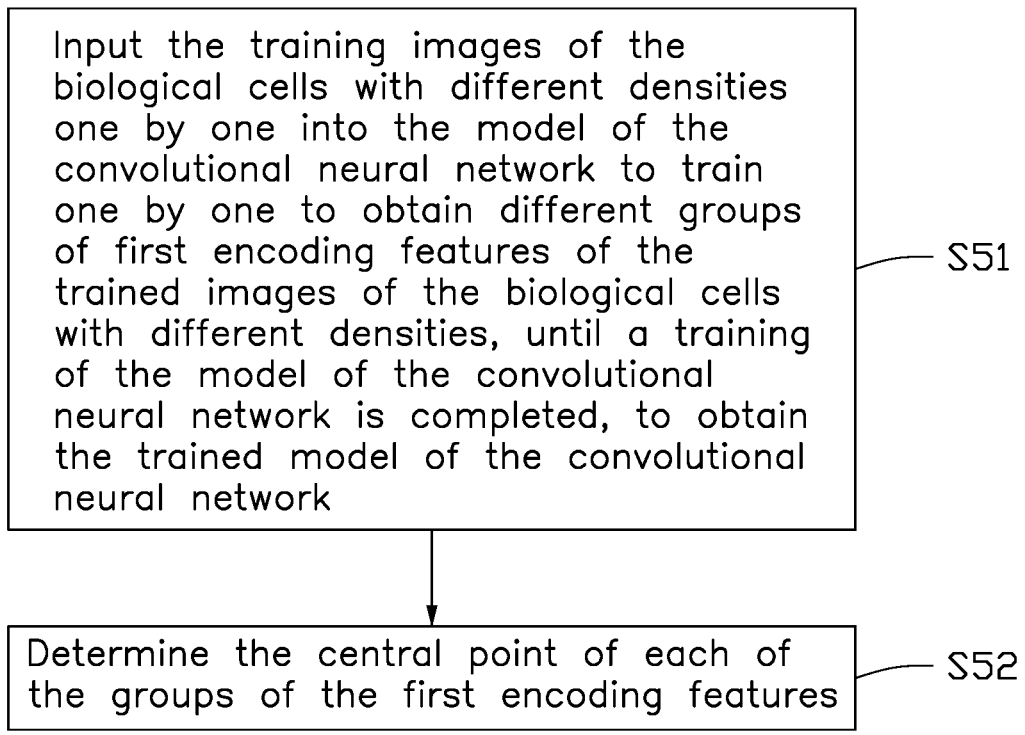
FIG. 5 illustrates a flowchart of a process for inputting a number of training images of biological cells with different densities one by one into a model of convolutional neural network to obtain a trained model of the convolutional neural network of the method in FIG. 4.

Referring to FIG. 5, the inputting of the training images of the biological cells with different densities one by one into a model of the convolutional neural network to train one by one to obtain a trained model of the convolutional neural network can include a block S51 and a block S52.

The block S51 includes inputting the training images of the biological cells with different densities one by one into the model of the convolutional neural network to train one by one to obtain different groups of first encoding features of the trained images of the biological cells with different densities, until a training of the model of the convolutional neural network is completed. The trained model of the convolutional neural network is thereby obtained.

The block S52 includes determining the central point of each of the groups of the first encoding features.

In the embodiment of this method, before the inputting of the training images of the biological cells with different densities one by one into the model of the convolutional neural network to train one by one to obtain different groups of first encoding features of the trained images of the biological cells with different densities until a training of the model of the convolutional neural network is completed to obtain the trained model of the convolutional neural network, this method further includes a block b1.

The block b1 can include dividing the training images of the biological cells with different densities into a number of training images of the biological cells with a number of different ranges of densities. For example, the method can divide the training images of the biological cells with a density of 11%, a density of 21%, a density of 30%, a density of 50%, a density of 70%, and a density of 90% into the training images of the biological cells with a respective range of densities from zero to 40%, a range of densities from 40% to 60%, a range of densities from 60% to 80%, and a range of densities from 80% to 100%.

Figure 6:
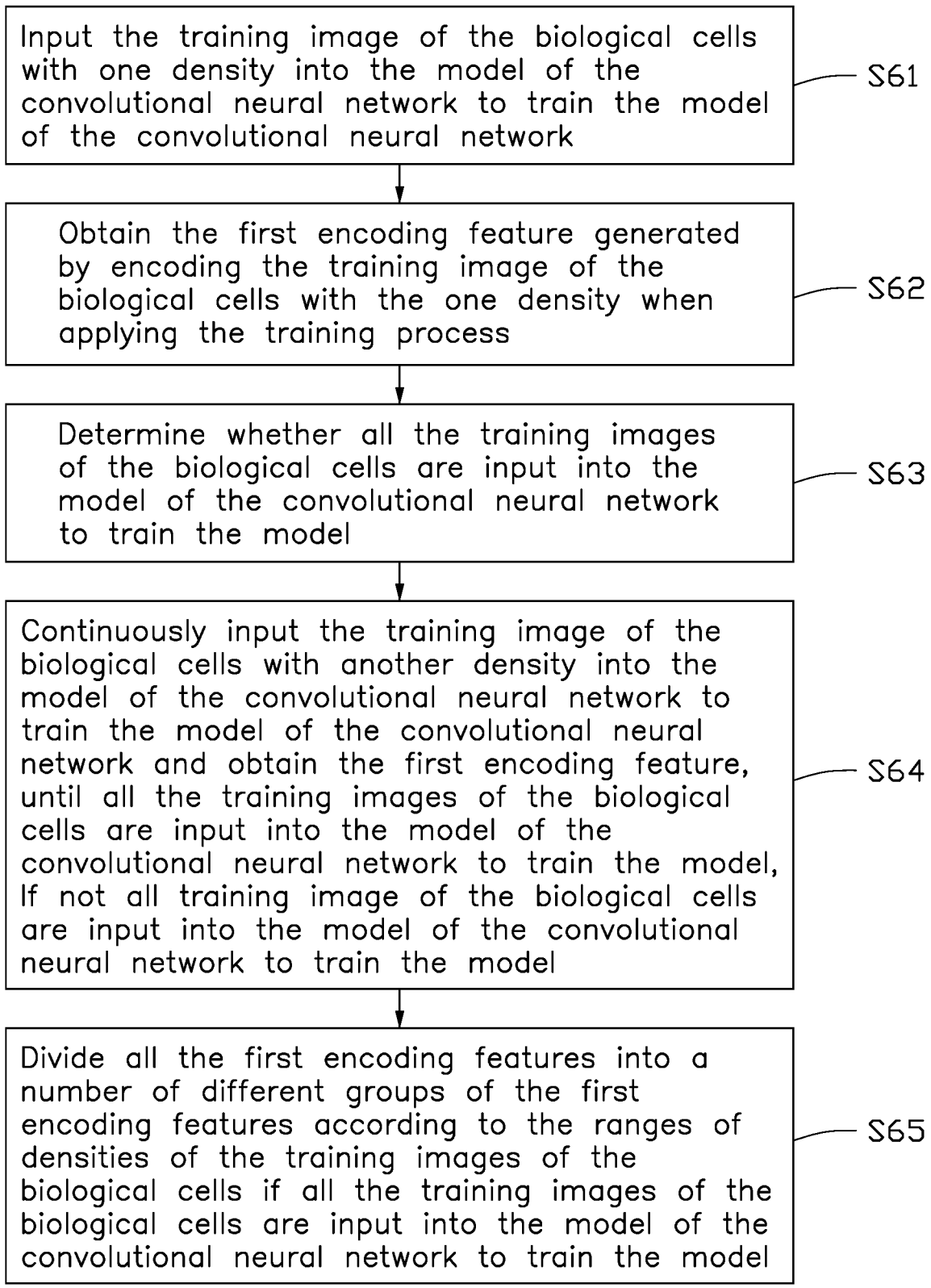
FIG. 6 illustrates a flowchart of a process for inputting a number of training images of the biological cells with different densities one by one into the model of the convolutional neural network to train one by one to obtain different groups of first encoding features of the training images of the biological cells with different ranges of densities until a training of the model of the convolutional neural network is completed to obtain the trained model of the convolutional neural network of the process in FIG. 5.

Referring to FIG. 6, the inputting of the training images of the biological cells with different densities one by one into the model of the convolutional neural network to train one by one to obtain different groups of first encoding features of the trained images of the biological cells with different densities until a training of the model of the convolutional neural network is completed, to obtain the trained model of the convolutional neural network, can include a block S61, A block S62, a block S63, and a block S65.

The block S61 includes inputting the training image of the biological cells with one density into the model of the convolutional neural network to train the model of the convolutional neural network.

The block S62 includes obtaining the first encoding feature generated by encoding the training image of the biological cells with the one density when applying the training process.

The block S63 includes determining whether all the training images of the biological cells are input into the model of the convolutional neural network to train the model.

The block S65 includes dividing all the first encoding features into a number of different groups of the first encoding features according to the ranges of densities of the training images of the biological cells if all the training images of the biological cells are input into the model of the convolutional neural network to train the model.

The block S65 can be, for example, as described above, dividing the training images of the biological cells with respective densities of 11%, of 21%, 30%, of 50%, of 70%, and of 90% into the training images of the biological cells with a range of densities from zero to 40%, a range of densities from 40% to 60%, a range of densities from 60% to 80%, and a range of densities from 80% to 100%. All the training images of the biological cells with the density of 11%, the density of 21%, the density of 30%, the density of 50%, the density of 70%, and the density of 90% are input into the model of the convolutional neural network one by one to obtain a corresponding first encoding feature 1, a corresponding first encoding feature 2, a corresponding first encoding feature 3, a corresponding first encoding feature 4, a corresponding first encoding feature 5, and a corresponding first encoding feature 6. The block S65 can divide the all first encoding features into a first group of the first encoding features including the first encoding feature 1, the first encoding feature 2, and the first encoding feature 3, and the block 65 can also create by a process of division a second group of the first encoding features including the first encoding feature 4, a third group of the first encoding features including the first encoding feature 5, and a fourth group of the first encoding features including the first encoding feature 6 according to the range of densities from zero to 40%, the range of densities from 40% to 60%, the range of densities from 60% to 80%, and the range of densities from 80% to 100%.

In the embodiment, after determining whether all the training images of the biological cells are input into the model of the convolutional neural network to train the model, the method further includes a block c1. The block c1 can include obtaining the trained model of the convolutional neural network if all the training images of the biological cells are input into the model of the convolutional neural network to train the model.

In the embodiment, before dividing all the first encoding features into a number of different groups of the first encoding features according to the ranges of densities of the training images of the biological cells if all training images of the biological cells are input into the model of the convolutional neural network to train the model, the method further includes a block S64.

The block S64 includes continuously inputting the training image of the biological cells with another density into the model of the convolutional neural network if not all training images of the biological cells are input into the model of the convolutional neural network to train the model, and obtaining the first encoding feature until all the training images of the biological cells are input into the model of the convolutional neural network to train the model.

In the embodiment, a method of determining the central point of each of the groups of the first encoding features can include a block d1. The block d1 can include calculating an average value of each group of the first encoding features to determine a central point of each group of the first encoding feature.

At block S43, obtaining positional information of all central points of all groups of first encoding features generated when training the model of the convolutional neural network and ranges of densities of images of biological cells represented by different central points. Each of the groups of the first encoding features includes a central point and corresponds to a number of images of the biological cells within a range of densities.

The block S43 of the second embodiment is the same as the block S31 of the first embodiment, details thereof are as the description of the block S31 of the first embodiment, which will not be repeated.

At block S44, inputting a test image of the biological cells into the trained model of the convolutional neural network to encode the test image of the biological cells, to obtain a second encoding feature.

The block S44 of the second embodiment is the same as the block S32 of the first embodiment, details thereof are as the description of the block S32 of the first embodiment, which will not be repeated.

At block S45, determining a central point nearest to the second encoding feature according to the positional information of all the central points of all the groups of the first encoding features.

The block S45 of the second embodiment is the same as the block S33 of the first embodiment, details thereof are as the description of the block S33 of the first embodiment, which will not be repeated.

At block S46, determining a range of densities of the test image of the biological cells according to the ranges of densities of the images of the biological cells represented by different central points and the central point nearest to the second encoding feature.

The block S46 of the second embodiment is the same as the block S34 of the first embodiment, details thereof are as the description of the block S34 of the first embodiment, which will not be repeated.

In the disclosure, a number of training images of the biological cells with different densities is obtained. The disclosure inputs the training images of the biological cells with different densities one by one into the model of the convolutional neural network to train one by one to obtain the trained model of the convolutional neural network. The disclosure obtains the positional information of all central points of all the groups of the first encoding features generated when training the model of the convolutional neural network and the ranges of the densities of the images of the biological cells represented by different central points. Each of the groups of the first encoding features includes a central point and corresponds to a number of images of the biological cells within a range of densities. The disclosure inputs a test image of the biological cells into the trained model of the convolutional neural network to encode the test image of the biological cells, to obtain a second encoding feature. The disclosure determines a central point nearest to the second encoding feature according to the positional information of all central points of all groups of the first encoding features. The disclosure determines the range of densities of the test image of the biological cells according to the ranges of densities of the images of the biological cells represented by different central points and the central point nearest to the second encoding feature. Thus, the disclosure trains the model of the convolutional neural network by inputting the training images of the biological cells with different densities one by one. And in the disclosure, the range of densities of the test image of the biological cells is determined, according to the trained model of the convolutional neural network, the positional information of all central points of all groups of the first encoding features generated when training the model of the convolutional neural network, and the ranges of the densities of the images of the biological cells represented by different central points. No calculation of the number and volume of the cells is needed, improving a speed of counting cells.

Figure 7:
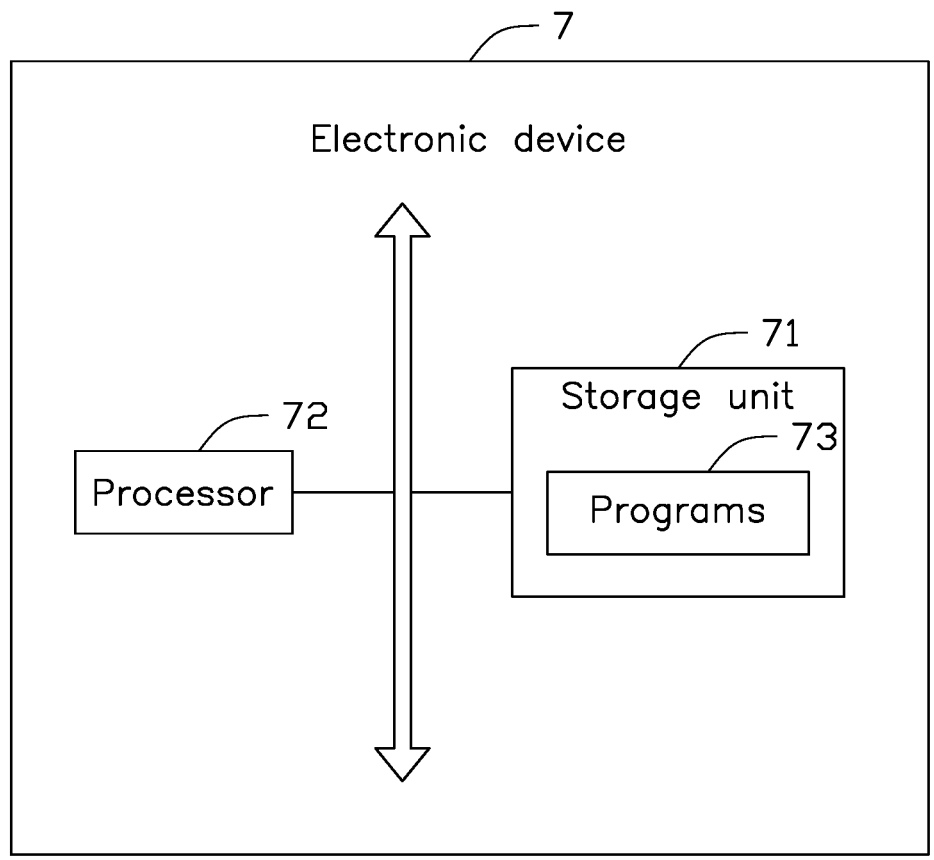
FIG. 7 illustrates a block diagram of an electronic device in a third embodiment.

FIG. 7 illustrates a block diagram of an electronic device in a third embodiment. The electronic device 7 can include a storage unit 71, at least one processor 72, and one or more programs 73 stored in the storage unit 71 which can be run on the at least one processor 72. The at least one processor 72 can execute the one or more programs 73 to accomplish the steps of the exemplary method. Or the at least one processor 72 can execute the one or more programs 73 to accomplish the functions of the modules of the exemplary device.

The one or more programs 73 can be divided into one or more modules/units. The one or more modules/units can be stored in the storage unit 71 and executed by the at least one processor 72 to accomplish the disclosed purpose. The one or more modules/units can be a series of program command segments which can perform specific functions, and the command segment is configured to describe the execution process of the one or more programs 73 in the electronic device 7. For example, the one or more programs 73 can be divided into modules as shown in the FIG. 1 and the FIG. 2, the functions of each module are as described in the first embodiment and the second embodiment.

The electronic device 7 can be any suitable electronic device, for example, a personal computer, a tablet computer, a mobile phone, a PDA, or the like. A person skilled in the art knows that the device in FIG. 7 is only an example and is not to be considered as limiting of the electronic device 7, another electronic device 7 may include more or fewer parts than the diagram, or may combine certain parts, or include different parts, such as more buses, electronic device 7 and so on.

The at least one processor 72 can be one or more central processing units, or it can be one or more other universal processors, digital signal processors, application specific integrated circuits, field-programmable gate arrays, or other programmable logic devices, discrete gate or transistor logic, discrete hardware components, and so on. The at least one processor 72 can be a microprocessor or the at least one processor 72 can be any regular processor or the like. The at least one processor 72 can be a control center of the electronic device 7, using a variety of interfaces and lines to connect various parts of the entire electronic device 7.

The storage unit 71 stores the one or more programs 73 and/or modules/units. The at least one processor 72 can run or execute the one or more programs and/or modules/units stored in the storage unit 71, call out the data stored in the storage unit 71 and accomplish the various functions of the electronic device 7. The storage unit 71 may include a program area and a data area. The program area can store an operating system, and applications that are required for the at least one function, such as sound or image playback features, and so on. The data area can store data created according to the use of the electronic device 7, such as audio data, and so on. In addition, the storage unit 71 can include a non-transitory storage medium, such as hard disk, memory, plug-in hard disk, smart media card, secure digital, flash card, at least one disk storage device, flash memory, or another non-transitory storage medium.

If the integrated module/unit of the electronic device 7 is implemented in the form of or by means of a software functional unit and is sold or used as an independent product, all parts of the integrated module/unit of the electronic device 7 may be stored in a computer-readable storage medium. The electronic device 7 can use one or more programs to control the related hardware to accomplish all parts of the method of this disclosure. The one or more programs can be stored in a computer-readable storage medium. The one or more programs can apply the exemplary method when executed by the at least one processor. The one or more stored programs can include program code.

The program code can be in the form of source code, object code, executable code file, or in some intermediate form. The computer-readable storage medium may include any entity or device capable of recording and carrying the program codes, recording media, USB flash disk, mobile hard disk, disk, computer-readable storage medium, and read-only memory.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A method for classifying densities of cells comprising:
    obtaining positional information of all central points of all groups of first encoding features generated when training a model of convolutional neural network and ranges of densities of images of biological cells represented by different central points; each of the groups of the first encoding features comprising a central point and corresponding to a plurality of images of the biological cells within a range of densities;
    inputting a test image of the biological cells into a trained model of the convolutional neural network to encode the test image of the biological cells, to obtain a second encoding feature;
    determining a central point nearest to the second encoding feature according to the positional information of all the central points of all the groups of the first encoding features;
    determining a range of densities of the test image of the biological cells according to the ranges of densities of the images of the biological cells represented by different central points and the central point nearest to the second encoding feature.

2. The method according to claim 1, wherein the method further comprises:
    obtaining a plurality of training images of biological cells with different densities;
    inputting the training images of the biological cells with different densities one by one into the model of the convolutional neural network to train one by one to obtain the trained model of the convolutional neural network.

3. The method according to claim 2, wherein the inputting the training images of the biological cells with different densities one by one into the model of the convolutional neural network to train one by one to obtain the trained model of the convolutional neural network comprises:
    inputting the training images of the biological cells with different densities one by one into the model of the convolutional neural network to train one by one to obtain different groups of the first encoding features of the trained images of the biological cells with different densities, until a training of the model of the convolutional neural network is completed, to obtain the trained model of the convolutional neural network;
    determining the central point of each of the groups of the first encoding features.

4. The method according to claim 3, wherein before the inputting the training images of the biological cells with different densities one by one into the model of the convolutional neural network to train one by one to obtain different groups of the first encoding features of the trained images of the biological cells with different densities, until a training of the model of the convolutional neural network is completed, to obtain the trained model of the convolutional neural network, the method further comprises:
    dividing the training images of the biological cells with different densities into a plurality of training images of the biological cells with a plurality of different ranges of densities.

5. The method according to claim 4, wherein the inputting the training images of the biological cells with different densities one by one into the model of the convolutional neural network to train one by one to obtain different groups of the first encoding features of the trained images of the biological cells with different densities, until a training of the model of the convolutional neural network is completed, to obtain the trained model of the convolutional neural network comprises:
    inputting the training image of the biological cells with one density into the model of the convolutional neural network to train the model of the convolutional neural network;
    obtaining the first encoding feature generated by encoding the training image of the biological cells with the one density when applying the training process;
    determining whether all the training images of the biological cells are input into the model of the convolutional neural network to train the model;
    dividing all the first encoding features into a plurality of different groups of the first encoding features according to the ranges of the densities of the training images of the biological cells if all the training images of the biological cells are input into the model of the convolutional neural network to train the model.

6. The method according to claim 5, wherein the inputting the training images of the biological cells with different densities one by one into the model of the convolutional neural network to train one by one to obtain different groups of the first encoding features of the trained images of the biological cells with different densities, until a training of the model of the convolutional neural network is completed, to obtain the trained model of the convolutional neural network further comprises:
    continuously inputting the training image of the biological cells with another density into the model of the convolutional neural network to train the model of the convolutional neural network and obtaining the first encoding feature, until all the training images of the biological cells are input into the model of the convolutional neural network to train the model, if not all training images of the biological cells are input into the model of the convolutional neural network to train the model.

7. The method according to claim 3, wherein the determining the central point of each of the groups of the first encoding features comprises:
    calculating an average value of each group of the first encoding features to determine a central point of each group of the first encoding feature.

8. An electronic device comprising:
    a storage device;
    at least one processor; and
    the storage device storing one or more programs, which when executed by the at least one processor, cause the at least one processor to:

obtain positional information of all central points of all groups of first encoding features generated when training a model of convolutional neural network and ranges of densities of images of biological cells represented by different central points; each of the groups of the first encoding features comprising a central point and corresponding to a plurality of images of the biological cells within a range of densities;

input a test image of the biological cells into a trained model of the convolutional neural network to encode the test image of the biological cells, to obtain a second encoding feature;

determine a central point nearest to the second encoding feature according to the positional information of all the central points of all the groups of the first encoding features;

determine a range of densities of the test image of the biological cells according to the ranges of densities of the images of the biological cells represented by different central points and the central point nearest to the second encoding feature.

9. The electronic device according to claim 8, further causing the at least one processor to:

obtain a plurality of training images of biological cells with different densities;

input the training images of the biological cells with different densities one by one into the model of the convolutional neural network to train one by one to obtain the trained model of the convolutional neural network.

10. The electronic device according to claim 9, further causing the at least one processor to:

input the training images of the biological cells with different densities one by one into the model of the convolutional neural network to train one by one to obtain different groups of the first encoding features of the trained images of the biological cells with different densities, until a training of the model of the convolutional neural network is completed, to obtain the trained model of the convolutional neural network;

determine the central point of each of the groups of the first encoding features.

11. The electronic device according to claim 10, before the inputting the training images of the biological cells with different densities one by one into the model of the convolutional neural network to train one by one to obtain different groups of the first encoding features of the trained images of the biological cells with different densities, until a training of the model of the convolutional neural network is completed, to obtain the trained model of the convolutional neural network, further causing the at least one processor to:

divide the training images of the biological cells with different densities into a plurality of training images of the biological cells with a plurality of different ranges of densities.

12. The electronic device according to claim 11, further causing the at least one processor to:

input the training image of the biological cells with one density into the model of the convolutional neural network to train the model of the convolutional neural network;

obtain the first encoding feature generated by encoding the training image of the biological cells with the one density when applying the training process;

determine whether all the training images of the biological cells are input into the model of the convolutional neural network to train the model;

divide all the first encoding features into a plurality of different groups of the first encoding features according to the ranges of the densities of the training images of the biological cells if all the training images of the biological cells are input into the model of the convolutional neural network to train the model.

13. The electronic device according to claim 12, further causing the at least one processor to:

continuously input the training image of the biological cells with another density into the model of the convolutional neural network to train the model of the convolutional neural network and obtain the first encoding feature, until all the training images of the biological cells are input into the model of the convolutional neural network to train the model, if not all training images of the biological cells are input into the model of the convolutional neural network to train the model.

14. The electronic device according to claim 10, further causing the at least one processor to:

calculate an average value of each group of the first encoding features to determine a central point of each group of the first encoding feature.

15. A non-transitory storage medium storing a set of commands, when the commands being executed by at least one processor of an electronic device, causing the at least one processor to:

obtain positional information of all central points of all groups of first encoding features generated when training a model of convolutional neural network and ranges of densities of images of biological cells represented by different central points; each of the groups of the first encoding features comprising a central point and corresponding to a plurality of images of the biological cells within a range of densities;

input a test image of the biological cells into a trained model of the convolutional neural network to encode the test image of the biological cells, to obtain a second encoding feature;

determine a central point nearest to the second encoding feature according to the positional information of all the central points of all the groups of the first encoding features;

determine a range of densities of the test image of the biological cells according to the ranges of densities of the images of the biological cells represented by different central points and the central point nearest to the second encoding feature.

16. The non-transitory storage medium according to claim 15, further causing the at least one processor to:

obtain a plurality of training images of biological cells with different densities;

input the training images of the biological cells with different densities one by one into the model of the convolutional neural network to train one by one to obtain the trained model of the convolutional neural network.

17. The non-transitory storage medium according to claim 16, further causing the at least one processor to:

input the training images of the biological cells with different densities one by one into the model of the convolutional neural network to train one by one to obtain different groups of the first encoding features of the trained images of the biological cells with different densities, until a training of the model of the convolutional neural network is completed, to obtain the trained model of the convolutional neural network;

determine the central point of each of the groups of the first encoding features.

18. The non-transitory storage medium according to claim 17, before the inputting the training images of the biological cells with different densities one by one into the model of the convolutional neural network to train one by one to obtain different groups of the first encoding features of the trained images of the biological cells with different densities, until a training of the model of the convolutional neural network is completed, to obtain the trained model of the convolutional neural network, further causing the at least one processor to:

divide the training images of the biological cells with different densities into a plurality of training images of the biological cells with a plurality of different ranges of densities.

19. The non-transitory storage medium according to claim 18, further causing the at least one processor to:

input the training image of the biological cells with one density into the model of the convolutional neural network to train the model of the convolutional neural network;

obtain the first encoding feature generated by encoding the training image of the biological cells with the one density when applying the training process;

determine whether all the training images of the biological cells are input into the model of the convolutional neural network to train the model;

divide all the first encoding features into a plurality of different groups of the first encoding features according to the ranges of the densities of the training images of the biological cells if all the training images of the biological cells are input into the model of the convolutional neural network to train the model.

20. The non-transitory storage medium according to claim 17, further causing the at least one processor to:

calculate an average value of each group of the first encoding features to determine a central point of each group of the first encoding feature.

* * * * *